Jan. 24, 1961 D. R. BENNION 2,969,524

BIDIRECTIONAL SHIFT REGISTER

Filed Nov. 25, 1957 2 Sheets-Sheet 1

INVENTOR.
DAVID R. BENNION

BY Christie, Parker & Hale
ATTORNEYS

INVENTOR.
DAVID R. BENNION
BY Christie, Parker & Hale
ATTORNEYS

United States Patent Office 2,969,524

Patented Jan. 24, 1961

2,969,524

BIDIRECTIONAL SHIFT REGISTER

David R. Bennion, Loma Mar, Calif., assignor to Burroughs Corporation, Detroit, Mich., a corporation of Michigan Filed Nov. 25, 1957, Ser. No. 698,615

10 Claims. (Cl. 340—174)

This invention relates to magnetic core circuits, and more particularly is concerned with a magnetic core shift register in which information can be transferred bidirectionally.

Shifting registers for storing binary information are well known. Furthermore, it has heretofore been proposed to make shifting register circuits using magnetic cores as the binary storage elements. Conventional core register circuits require diodes in the coupling loops between cores to effect transfer, limiting the shifting of information to one direction. Known core registers of this type are essentially unidirectional shift registers.

In copending application Serial No. 698,633 filed concurrently herewith in the name of Hewitt D. Crane and assigned to the assignee of the present invention, there is described a core register having a novel transfer circuit requiring no diodes or other impedance elements in the transfer loops. However, even in this improved core circuit, the transfer coupling loop is taught as having more turns on the transmitting core than on the receiving core to compensate for flux loss resulting from inherent resistance in the transfer loop. Thus, although no diodes are required in the coupling loop, the coupling loop is nonsymmetrical and shifting takes place in only one direction in the register. As described in the above-mentioned copending application, the shifting register as therein described can be made bidirectional by providing two coupling loops between cores for respectively shifting information in two directions between cores. While providing satisfactory bidirectional operation, provision of double coupling loops increases the complexity of the circuit and the cost of its construction.

By the present invention a core register is provided in which bits of information stored in magnetic cores may be selectively shifted in either direction. The coupling loops between cores are made completely symmetrical so that the same coupling loops can be used for transferring information in either direction. The direction in which information is shifted in the register is determined solely by the pulsing sequence of the various core windings in the shift register. Thus the present invention provides a core register which has a perfectly symmetrical coupling circuit for effecting transfer in either direction so that the circuit can operate bidirectionally without complicated transfer circuitry, thereby minimizing the cost of construction and improving the efficiency of operation, while at the same time increasing the flexibility of the register for use in computers.

In brief, the shift register comprises at least two cores of magnetic material which are preferably annular in shape and have a high flux remanence. Means including windings on the cores is provided for saturating the flux in one direction in each of the cores. Each core has a pair of apertures, the cores being coupled by a transfer loop linking the cores through one of the apertures in each core. The loop consists of a pair of windings, one winding on each core, connected in parallel, the windings having equal numbers of turns. Binary zeros are stored in the cores in the form of a flux pattern in which all of the flux is oriented in the same direction on both sides of each of the apertures. Binary ones are stored in the cores in the form of a flux pattern in which flux is oriented in opposite directions on either side of the apertures.

Transfer of binary digits so stored is accomplished from either core, designated the transmitting core, to the other core, designated the receiving core, by first saturating the receiving core in one direction to thereby store a binary zero. A pulse is next applied in time sequence to the transfer loop. The magnitude of the pulse is below the threshold required to switch flux in the cores when the transmitting core is in the binary zero condition, but above the threshold required to switch flux in the cores when the transmitting core is in the binary one condition. The transfer pulse has the effect of regenreating the flux level in the transmitting core to overcome any flux loss resulting from transfer into the transmitting core from a previous core in the register.

For a better understanding of the invention, reference should be had to the accompanying drawings, wherein.

Figure 1:
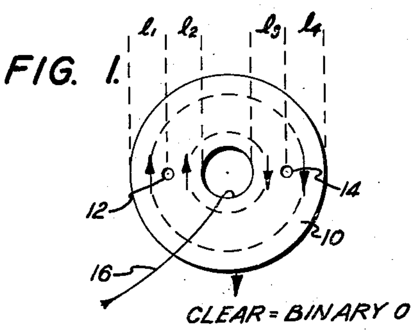
Figs. 1 and 2 show a ferrite magnetic core element used in the present invention.

Consider an annular core, such as indicated at 10 in Fig. 1, made of a magnetic material, such as ferrite, having a "square" hysteresis loop, i.e., a material having a high flux retentivity or remanence. The annular core is provided with two apertures 12 and 14. Each of the apertures in effect divides the core into legs or parallel flux paths, the aperture 12 forming two legs $l_1$ and $l_2$, and the aperture 14 forming two legs $l_3$ and $l_4$. If a large current is passed through the central opening of the core 10, as by a clearing winding 16, the flux in the core may be saturated in a clockwise direction, as indicated by the arrows, and the core is said to be in cleared, or binary zero, state. If a current is passed through one of the apertures 12 or 14, as by passing a current through a winding 18 passing through the aperture 12, as described in detail in the above-mentioned copending application, the flux in the legs $l_1$ and $l_3$ are reversed, as indicated by the arrows. The resulting flux pattern in the core is shown by the dotted lines, and the core is said to be in the set, or binary one, state.

Figure 2:
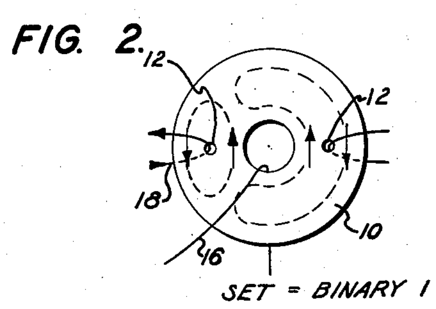
Figure 3:
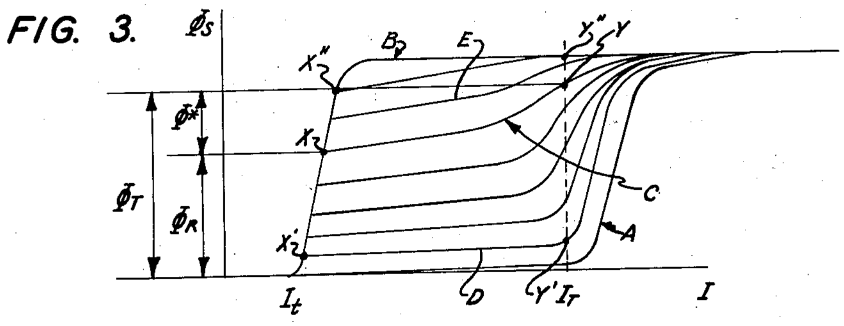
Fig. 3 is a set of curves illustrating the magnetizing properties of the core element of Fig. 1 in response to current passing through one of the small apertures in the core element.

If the core 10 is initially in its cleared condition, applying a current through the winding 18 linking the aperture 12 of the core 10, switches flux according to the relation set forth by curve A in Fig. 3. Thus as the current is increased up to a threshold level $I_T$, substantially no flux is switched in the core. When the current exceeds the threshold level, the flux rapidly begins to shift with further increase of current until a saturattion level is reached in which all of the flux is switched in the opposite direction. As mentioned above, this results in the flux pattern of Fig. 2 in which the core is in its set or binary one condition.

If the current is now passed through the winding 18 in the opposite direction, the resulting shift in flux as a function of current is represented by curve B of Fig. 3. It will be seen that the current increases to a lower threshold level $I_t$ which is substantially less than the threshold level $I_T$ of curve A. The flux then begins to shift until a saturation level is reached in which all of the flux is switched that can be switched. What is happening in the latter case is that current passing through the winding 18 switches flux locally around the aperture 12 but does not switch any flux around the aperture 14.

Figure 4:
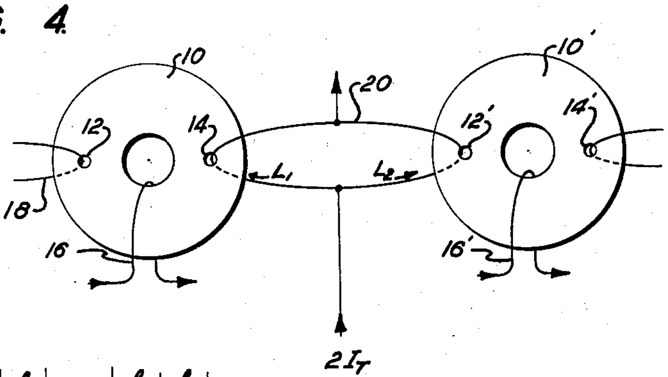
Fig. 4 is a schematic showing of a transfer circuit linking a pair of core elements.

As further described in the above-identified copending application, the flux state of one core can be transferred to another core in the following manner. Consider the circuit of Fig. 4 including a transmitting core 10 and a receiving core 10′. A coupling loop 20 links the core 10 through the aperture 14 to the core 10′ through the aperture 12′. Assume a current applied across the transfer loop 20 equal substantially to twice the threshold current $I_T$. It will be seen that the current splits between the winding linking the aperture 14 of the transmitting core and the aperture 12′ of the receiving core. If both cores are in their cleared condition and the resistances are arranged so that the ampere turns linking the two cores are substantially equal, no flux will be switched in either the transmitting or the receiving core. However, if the transmitting core 10 has been previously set with its flux in the binary one condition, a current passing through the aperture 14 can switch flux locally in the core 10, since the threshold level for switching flux locally about an aperture when the core is in the set condition is much lower, as shown by curve B in Fig. 3. The switching of flux about the aperture 14 and the transmitting core 10 induces a voltage in the coupling loops which, by Lenz's law, opposes the flow of current in the branch of the coupling loop linking the aperture 14 of the transmitting core. As a result the current passing through the branch of the transfer loop 20 which links the aperture 12′ of the receiving core 10′ increases. The increased current is sufficient to switch flux in the receiving core 10′, thereby setting the receiver to the binary one condition. Thus it will be seen that the application of a transfer pulse of predetermined magnitude across the transfer loop 20 leaves the receiving core 10′ in the binary zero state or changes it to the binary one state, depending upon the existing condition of the transmitting core 10.

To analyze the transfer operation more fully, consider a chain of cores linked by coupling loops in the manner described above in connection with Fig. 4. For analyzing the transfer operation between the $n$th core and the $n+1$ core, consider Fig. 5. If a binary one is being shifted from core to core, the flux shifted in the $n$th core received from the previous core during the shifting operation may be designated $\Phi_{Rn}$, and appears as flux switched in the legs $l_1$ and $l_3$. The flux available for transfer to the $n+1$ core may be designated $\Phi_{Tn}$, and for a transfer current pulse of given magnitude and duration is dependent on $\Phi_{Rn}$, as will hereinafter be made apparent. The $n$th core is shown in its set or binary one condition before a transfer pulse is applied to the coupling loop 20.

The core $n+1$, which is shown in its flux condition after the transfer pulse has been applied to the loop 20, has flux switched in the legs $l_1$ and $l_3$, which may be designated $\Phi_{Rn+1}$. The flux then available for transfer to the next core is designated $\Phi_{Tn+1}$.

To find the relationship between the available flux $\Phi_{Tn}$ in $_{Tn}$ the core $n$ and the resulting received flux $\Phi_{Rn+1}$ set in the core $n+1$ in response to a transfer pulse in the coupling loop 20, the properties of the coupling loop 20 must be considered. The two branches of the loop 20 which couple the $n$th core and the $n+1$ core may be considered as each including resistance, designated $R_T$ and $R_R$ respectively, and inductance, designated $L_T$ and $L_R$ respectively, in series with each winding. The resistance R is the wire resistance, and the inductance L is the saturation inductance of the winding. Assume that a rectangular pulse is applied across the transfer loop 20 of sufficient duration to switch all the flux in the leg $l_4$ of the core $n$. If $\phi_T$ and $\phi_R$ represent the transmitter and receiver flux respectively as functions of time during the transfer operation, by summing the various voltage drops in the two branch windings in the coupling loop 20, the following equation can be written:

$$L_T\frac{di_T}{dt}+R_Ti_T+N_T\frac{d\phi_T}{dt}=L_R\frac{di_R}{dt}+R_Ri_R+N_R\frac{d\phi_R}{dt} \quad (1)$$

In Equation 1, $i_T$ and $i_R$ are the currents existing in the two branches of the coupling loop 20 as functions of time during switching, and $N_T$ and $N_R$ represent the number of turns respectively in the windings of the two branches on the respective cores.

Integration of the equation of Fig. 1 yields the flux relation $$L_Ti_T+R_T\int_0^t i_Tdt+N_T\phi_T=L_Ri_R+R_R\int_0^t i_Rdt+N_R\phi_R \quad (2)$$

With the termination of the current pulse applied to the transfer loop, the current $i_T$ and $i_R$ in the two branches become zero, the flux $\phi_T$ comes equal to a total available transmitting flux $\Phi_T$, and the flux $\phi_R$ becomes equal to the total of the received flux $\Phi_R$. Moreover the integral of the current in each branch is the net charge that is fed through that branch, designated $Q_T$ and $Q_R$ respectively. Thus after a passage of time sufficient to reach a steady state condition after the pulsing of the transfer loop, Equation 2 may be written $$O+R_TQ_T+N_T\Phi_T=O+R_RQ_R+N_R\Phi_R \quad (3)$$

which can be rewritten $$\frac{\Phi_R}{\Phi_T}=\frac{N_T}{N_R}-\frac{\Phi_{loss}}{N_R\Phi_T} \quad (4)$$

where $$\Phi_{loss}=R_RQ_R-R_TQ_T \quad (5)$$

As pointed out above, during the transfer operation, the current in the receiver branch of the transfer loop increases at the expense of the current in the transmitter branch of the coupling loop. Thus the $\Phi_{loss}$ term in Equation 4 will always be greater than zero in the transfer operation, and accordingly the receiver flux $\Phi_R$ must be less than the transmitted available transmitter flux $\Phi_T$ for a unity turns ratio in the windings of the transfer loop. It will be apparent from Equation 4 that received flux $\Phi_R$ can be made equal to the available transmitter flux $\Phi_T$ by making the turns ratio greater than unity, i.e., by providing more turns $N_T$ in the transmitting branch of the transfer loop than the turns $N_R$ in the receiver branch of the transfer loop. It has heretofore been considered essential that in the transfer of the binary one condition, that the flux in the receiver should be equal to the available flux in the transmitter. Otherwise it was considered that the flux loss resulting from transfer from core to core would ultimately result in the loss of binary one information bits. However, it has been discovered that this assumption is not true. This may be appreciated from the following considerations.

First, it is axiomatic that, in order for a binary one bit to be transferred from core to core indefinitely, no flux be lost in the transfer process. This means that the flux $\Phi_{TN}$ available in the transmitter core and the flux $\Phi_{Tn+1}$ available in the receiver core after the transfer operation must be equal. The ratio of available flux in the transmitter core and in the receiver core after transfer may be referred to as the flux gain G and may be expressed mathematically as $$G_{n\rightarrow(n+1)}=\frac{\Phi_{Tn+1}}{\Phi_{Tn}} \quad (6)$$

If the flux $\Phi_T$ available in a core is considered equal to the flux $\Phi_R$ received in that core by a previous transfer operation, then the turns ratio of the transfer loop would have to be greater than unity in order that the flux gain from core to core would be unity. However, an examination of Equation 6 indicates another possibility, namely, that the gain may be unity if the available flux for transmission in a given core is somewhat larger than the flux received from the preceding core. It is the discovery that this is indeed possible which has led to the present invention in which a bidirectional shifting register is accomplished using unity turns ratio in the two branch windings of the coupling loops between cores.

Figure 6:
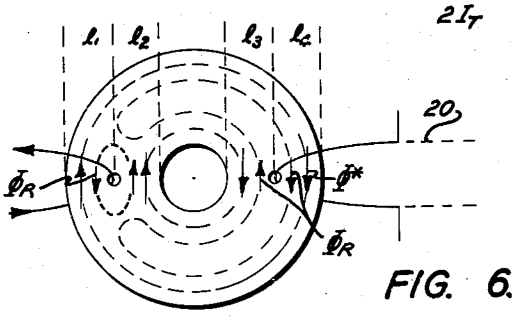
Fig. 6 shows the flux pattern in a partially switched core.

To understand how the available flux $\Phi_T$ can be made larger than the received flux $\Phi_R$, consider the core shown in Fig. 6. Here the received flux $\Phi_R$, i.e., the flux switched in the legs $l_1$ and $l_3$ of the core, is shown by the arrows to be less than the total available flux. It will be seen that the amount of flux $\Phi_R$ is available for switching in the output leg $l_4$ by a transfer pulse applied to the coupling loop. This is the local flux which is switched around the output aperture and requires a fairly low current to exceed the threshold level at which any flux can be switched around this local path. However, unless all the flux in leg $l_1$ was switched during reception, additional flux $\Phi^*$ is available to be switched in the leg $l_4$ around the central aperture of the core, since after the flux $\Phi_R$ is switched, the leg $l_3$ is saturated and can accept no additional flux. Thus the total flux $\Phi_T$ available for switching in response to a transfer pulse is the sum of the flux $\Phi_R+\Phi^*$. The gain equation thus can be written $$G=\frac{\Phi_{Rn+1}+\Phi^*_{n+1}}{\Phi_{Tn}} \quad (7)$$

It is evident from Equation 7 that the flux gain from core to core might be made unity, even though the received flux $\Phi_R$ is less than the available flux $\Phi_T$ in the transmitter core by virtue of the flux $\Phi^*$ term.

It might be suspected that once all the flux $\Phi_R$ had been switched by the transfer pulse in the transmitting core, none of the flux $\Phi^*$ could be switched, since, by previous definition, the current level would presumably be below the threshold at which any flux may be switched around the large central opening of the core. However, it has been found in practice that this is not in fact the case. An examination of the curves of Fig. 3 shows a typical family of curves in which the flux is only partially set in the core during reception of a one. For example, consider curve C. As the current I is increased through the transfer winding, the flux first begins to shift locally around the associated aperture until a level is reached at which all the flux $\Phi_R$ has been switched. As the current continues to increase up to the limiting value $I_T$, additional flux is switched. This is the flux $\Phi^*$ and, as shown by the curve C of Fig. 3, is a significant amount of flux even though the current does not exceed the $I_T$ value.

The family of curves of Fig. 3 clearly shows that the value of $\Phi^*$ varies as a function of $\Phi_R$ for a given threshold transfer current $I_T$. At small values of $\Phi_R$, as represented by curve D, $\Phi^*$ is quite small. Compare points X' and Y'. This means that where $\Phi_R$ is small, as in transferring zeros, $\Phi^*$ is small. Losses in the transfer loop are sufficient to prevent build up of flux on successive transfers of zeros. However, at some intermediate value of $\Phi_R$, as indicated by curve C, $\Phi^*$ becomes relatively large. Compare points X and Y. In fact $\Phi$ becomes large enough to more than overcome losses in the transfer, even with a unity turns ratio in the transfer loop. At even larger values of $\Phi_R$, $\Phi^*$ becomes smaller again, as shown by curve E of Fig. 3. Compare points X'' and Y''.

It will be readily appreciated then that $\Phi^*$ maximizes at some value of $\Phi_R$. At this value of received flux $\Phi_R$, the gain is greater than unity even with unity turns ratio because of the large amount of flux in addition to the received flux which is switched by the transfer pulse in the transmitting core.

Consider again the gain Equation 7. Combining this with Equation 4 and assuming a unity turns ratio gives the expression:

$$G=1-\frac{\Phi_{loss}}{N_R\Phi_T}+\frac{\Phi^*}{\Phi_T}=1+\frac{N_R\Phi^*-\Phi_{loss}}{N_R\Phi_T} \quad (8)$$

The $\Phi_{loss}$ term increases monotonically as $\Phi_R$ increases. Since $\Phi^*$ varies as a function of $\Phi_R$ as pointed out above, reaching a maximum at some intermediate value of $\Phi_R$, there are at least two values of $\Phi_R$ at which the $N_R\,\Phi^*$ term of Equation 8 may be equal to $\Phi_{loss}$ and the gain be unity. The greater value of $\Phi_R$ at which unity gain occurs is a stable operating point, since if $\Phi_R$ tends to increase in successive transfers, $\Phi^*$ decreases and the gain goes down, thereby reducing the value of $\Phi_R$. If $\Phi_R$ tends to decrease during successive transfers, $\Phi^*$ increases and the gain goes up, thereby increasing the value of $\Phi_R$. It is evident therefore that with unity turns ratio, or even with a turns ratio less than unity, binary ones can be transferred indefinitely in a chain of cores and the received flux level maintained so that the information is not eroded or destroyed.

Figures 5, 7:
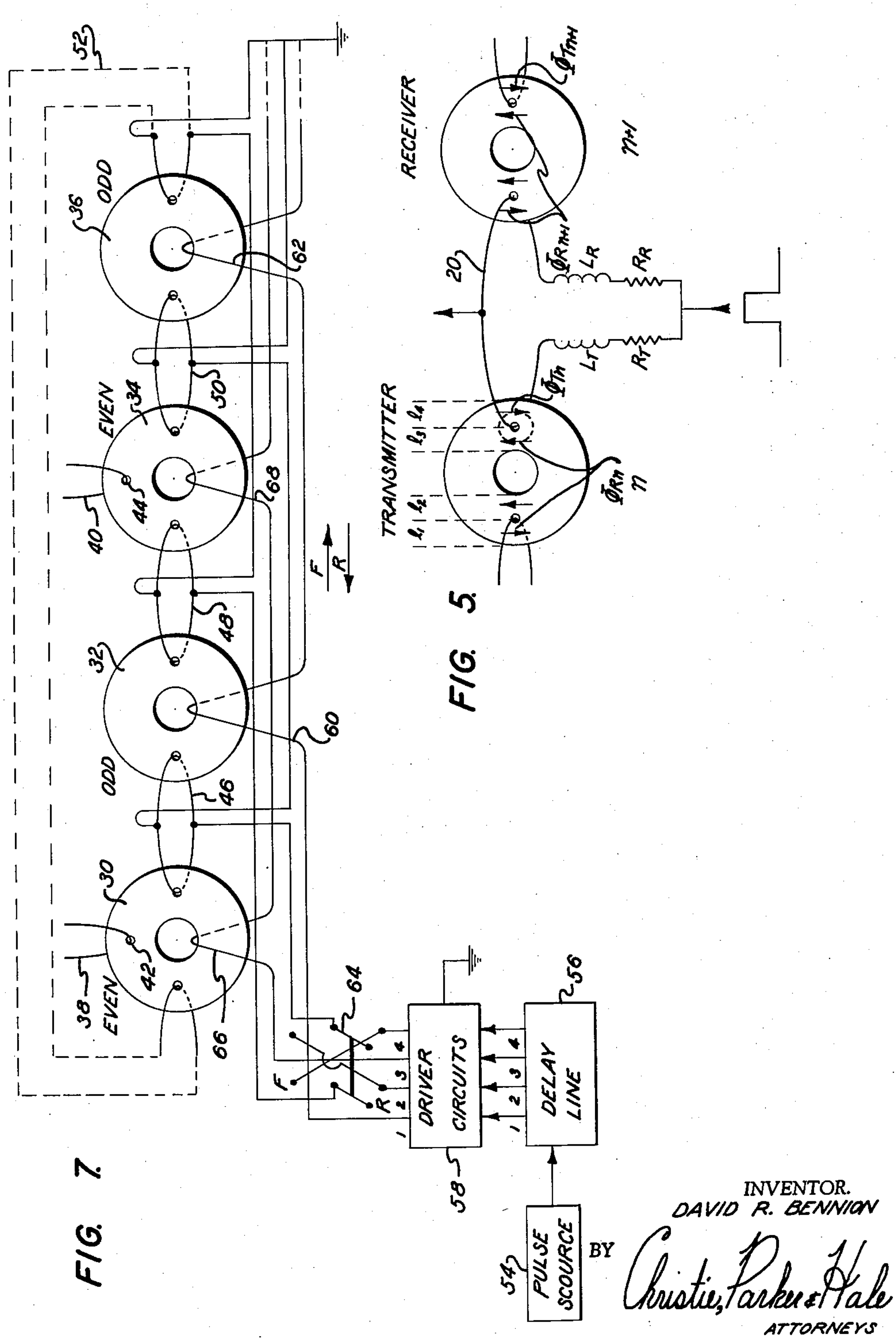
Fig. 5 is an equivalent circuit for the transfer circuit of Fig. 4.
Fig. 7 is a schematic showing of a bidirectional shift register circuit according to the present invention.

Referring to Fig. 7, there is shown a bidirectional shift register which operates according to the principles as developed above. The shift register may have any even number of cores, the specific example shown including four cores indicated at 30, 32, 34, and 36. Alternate cores 30 and 34 may be designated even cores and are the cores in which the binary bits are normally stored. Cores 32 and 36 are designated the odd cores and are used for temporary storage of the binary bits during the time the even cores are cleared in the shifting operation. The even cores 30 and 34 may be set to the binary one state by means of input windings 38 and 40 respectively, linking the input apertures 42 and 44 extending respectively through the cores 30 and 34. The cores are connected in pairs by transfer loops 46, 48, and 50. The end cores may be coupled together by a transfer loop 52, to recirculate information in the shifting core if desired.

Shifting pulses are derived from a suitable clock pulse source 54, the output of which is coupled to a delay line 56. The delay line has four output leads which are pulsed in succession in response to each output pulse from the source 54. Each of the outputs from the delay line 56 are shaped and amplified to the desired level by suitable driver circuits indicated at 58. The first pulse in point of time derived from the delay line 56 following a cycling pulse from the clock source 54 is coupled to the clearing windings on the odd cores, the clearing windings being indicated at 60 and 62. The second output pulse in point of time derived from the delay line 56 is connected through a double-pole double-throw switch 64 when it is in its F position to the coupling loops 46 and 50. The third output pulse in point of time derived from the delay line 56 is connected to the clearing windings 66 and 68 on the even cores 30 and 34. The fourth output pulse in point of time derived from the delay line 56 is coupled by the double-poled double-throw switch 64 when it is in the F position to the coupling loops 48 and 52.

In conformance with the principles above described, the coupling loops between the cores of the shift register are wound with equal number of turns in both branches. The double-pole double-throw switch 64 when in its R position, reverses the connection between the second and fourth outputs from the delay line 56. Since the core transfer circuits are made symmetrical, i.e., with equal turns in both branches of each coupling loop, shifting can be effected in either the forward direction or the reverse direction merely by reversing the switch 64.

In operation, with the switch in the forward position F, the first pulse in the shifting cycle, as derived from the delay line 56, clears all the odd cores. The second pulse derived from the delay line 56 in the shifting cycle, transfers the flux condition of the even cores to the odd cores. This means that if an even core is in its cleared condition corresponding to the binary digit zero, the odd core remains in the cleared condition following the transfer pulse; and if the even core is in the set condition corresponding to the binary digit one, the odd core is changed to the set condition by the transfer pulse.

With the bits stored in the even cores now transferred to the odd cores, the third pulse derived from the delay line 56 clears the even cores. The last pulse derived from the delay line 56 during the shifting cycle then transfers the condition in the odd cores to the next even cores to the right. Thus each shifting cycle, corresponding to one shift pulse from the source 54, results in a shifting of the information bits to the right from even core to even core.

If the switch 64 is reversed, with the odd cores cleared by the first pulse in the shifting cycle, the next pulse actuates the transfer loops for transferring the information bit from the even cores to the odd cores to the left. Following the clearing of the even cores, the transfer loops are then pulsed to transfer from the odd cores to the even cores from the left. Thus it will be seen that merely by interchanging the sequence of pulsing of the transfer loops, information can be shifted to the right or to the left, i.e., forward or reverse, as indicated by the arrows in Fig. 7.

From the above description it will be recognized that a core register is provided which achieves bidirectional shifting. Although the register is symmetrical by virtue of the unity turns ratio in the coupling windings between cores, the flux condition of the cores can be transferred or shifted without loss of flux, i.e., with unity gain, permitting bits to be shifted indefinitely without loss of information. Information is shifted bidirectionally between cores on the same coupling loops linking the cores merely by changing the pulsing sequence of the core clearing windings and the transfer loops.

Because unity turns ratio between windings in the coupling loops is accomplished, the register can be made with a single turn linking the apertures in the cores, thus greatly simplifying the core winding problem with a resultant lower cost of manufacture.

The bidirectional transfer arrangement of the present invention may be incorporated in multiple dimension arrays such as the two-dimensional array disclosed in the above-mentioned copending application. In fact the advantages of the present invention over the double coupling loop type of bidirectional register taught in the copending application are even more significant in connection with two- and three-dimensional arrays where each core has a large number of transfer loops associated with it.

What is claimed is:

1. Bidirectional shift register comprising a plurality of annular cores, the cores being of magnetic material having a substantially rectangular hysteresis loop, each of the cores having at least a pair of apertures in the core, each of the apertures dividing the annular cores in the regions of the respective apertures into two flux branches, a plurality of current conductive coupling loops linking the cores in a series configuration, each pair of adjacent cores having a single coupling loop therebetween, said coupling loop including a pair of windings in parallel, each of the windings linking one of the two branches formed by the apertures in the associated cores by passing the turns of winding through the apertures, the pair of windings of each coupling loop having equal numbers of turns, a clearing winding on each of the cores, the clearing winding linking the associated core through the opening formed by the annular shape of the core, shifting pulse generating means having four separate outputs which are electrically pulsed in succession during one shifting cycle on four separate outputs, the clearing windings of alternate cores being electrically connected to the first one of said outputs to be pulsed in a shifting cycle and the clearing windings of the remaining cores being electrically connected to the third one of said outputs to be pulsed in a shifting cycle, switching means for electrically connecting the two parallel windings of each one of alternate coupling loops to the second one or the fourth one of the outputs to be pulsed in a shifting cycle and electrically connecting the two parallel windings of each one of the remaining coupling loops to the fourth one of the outputs or the second one of the outputs to be pulsed in a shifting cycle, whereby the switching means selectively reverses the time sequence of the shifting pulses in a shifting cycle for shifting information bidirectionally in the register.

2. Bidirectional shift register comprising a plurality of annular cores, the cores being of magnetic material having a substantially rectangular hysteresis loop, each of the cores having at least a pair of apertures in the core, each of the apertures dividing the annular cores in the regions of the respective apertures into two flux branches, a plurality of current conductive coupling loops linking the cores in a series configuration, each pair of adjacent cores having a single coupling loop therebetween, said coupling loop including a pair of windings in parallel, each of the windings linking one of the two branches formed by the apertures in the associated cores by passing the turns of windings through the apertures, a clearing winding on each of the cores, the clearing winding linking the associated core through the opening formed by the annular shape of the core, shifting pulse generating means having four separate outputs which are electrically pulsed in succession during one shifting cycle on four separate outputs, the clearing windings of alternate cores being electrically connected to the first one of said outputs to be pulsed in a shifting cycle and the clearing windings of the remaining cores being electrically connected to the third one of said outputs to be pulsed in a shifting cycle, switching means for electrically connecting the two parallel windings of each one of alternate coupling loops to the second one or the fourth one of the outputs to be pulsed in a shifting cycle and electrically connecting the two parallel windings of each one of the remaining coupling loops to the fourth one of the outputs or the second one of the outputs to be pulsed in a shifting cycle, whereby the switching means selectively reverses the time sequence of the shifting pulses in a shifting cycle for shifting information bidirectionally in the register.

3. A shift register comprising a plurality of annular cores of magnetic material having a substantially rectangular hysteresis loop, each of the cores having at least two small apertures extending through the core, each aperture defining two separate legs in the core for the passage of flux, transfer loops linking the cores, each transfer loop including windings wound around one leg only of each of two cores, the legs being linked by passing the windings through one of said apertures of each of the associated cores coupled by a transfer loop, the windings in the loop having the same number of turns, whereby the coupling circuit between cores is symmetrical for bidirectional operation, a clearing winding wound on each core and linking the core by passing through the central opening formed by the annular core, first means for simultaneously pulsing the clearing windings of alternate cores with sufficient current to saturate the flux in the cores in one direction, second means for simultaneously pulsing the clearing windings of the remaining cores with sufficient current to saturate the flux in the cores in one direction, third means for simultaneously pulsing the coupling loops linking alternate pairs of cores with a unidirectional current, the current being of a magnitude in passing through the windings of the coupling loops to bring the cores just below the threshold magnetizing level at which the direction of flux in associated cores begins to reverse when the associated cores are in a saturated condition with all the flux in one direction, fourth means for simultaneously pulsing the remaining coupling loops with a unidirectional current of the same magnitude to bring the cores to said threshold magnetizing level when the associated cores are in a saturated condition with all the flux in one direction, and means responsive to a shifting pulse for successively actuating the first, third, second, and fourth pulsing means, in that order.

4. Apparatus as defined in claim 3 wherein said means responsive to a shifting pulse includes switching means for reversing the timing sequence in which the second and fourth pulsing means are actuated.

5. Apparatus comprising at least two storage elements, each element including a magnetic core of magnetic material having a substantially rectangular hysteresis loop and having at least three openings therethrough, the openings separating the core into four separate core legs, a first winding linking the core through a first one of said openings and being wound on a first one of said legs, a second winding linking the core through a second one of said openings and being wound on a second one of said legs, a clearing winding linking the core through a third one of said openings and wound on a portion of the core of larger cross-sectional area than any of said legs, first means for pulsing a unidirectional current through the clearing winding of sufficient magnitude to saturate the flux in each of said legs, the second winding of one core being directly connected across the first winding of the other core in parallel whereby the two windings form a closed loop conductive path, the two windings in the loop having the same number of turns, whereby the coupling circuit between cores is symmetrical for bidirectional operation, and second means for applying a transfer pulse across the two windings in parallel, the transfer pulse being of predetermined magnitude to bring the cores when saturated by the clearing winding to the threshold level at which flux starts to reverse in the cores, whereby the pulse does not materially alter the flux condition of the cores when they are both saturated by the respective clearing windings.

6. Apparatus as defined in claim 5 further including third and fourth means for individually pulsing the respective clearing windings, means for controlling the first, second, third and fourth pulsing means in predetermined sequence to pulse a clearing winding of one core, the transfer loop between cores, and the clearing winding of the other core in that order, and means for reversing the pulsing sequence, whereby either core can be selected to be cleared before the transfer depending on the desired direction of information transfer from core to core.

7. Apparatus as defined in claim 5 wherein the first and second windings each comprise a single turn passing through the respective apertures.

8. Apparatus for storing and transferring binary information comprising at least two annular magnetic cores, made of magnetic material having a substantially rectangular hysteresis loop, each of the cores having a large central aperture and at least two small apertures extending through the core material, a bidirectionally conductive low resistance transfer loop including two windings in parallel, the windings respectively linking one of the small apertures in each of the two cores, the two windings having equal numbers of turns, and means for applying an electrical transfer pulse across the two windings in parallel of magnitude such as to produce a current in each of the windings that is slightly less than the threshold current level required to switch flux in the associated cores when all the flux is set in one direction around the large central apertures of the annular cores.

9. Apparatus as defined in claim 8 further including means for respectively clearing all the flux in one direction in the two cores, and means for controlling the sequence in which the cores are cleared by said means.

10. A bidirectional magnetic shift register including first and second core elements of magnetic material having a substantially rectangular hysteresis loop, each core element having a large aperture defining a relatively long flux path and a pair of small apertures defining relatively short flux paths, each of the small apertures dividing the relatively long flux path into two parallel branches, a closed bidirectionally conductive loop including a first winding linking one of said parallel branches of the first core element through one of the small apertures and a second winding linking one of said parallel branches of the second core element through one of the small apertures, the first and second windings having equal numbers of turns, a first clearing winding linking the relatively long flux path of the first core element through the large aperture, a second clearing winding linking the relatively long flux path of the second core element through the large aperture, and a shifting control circuit including means for selectively pulsing current first through one of the clearing windings and means for subsequently pulsing a transfer current through the two apertures linked by the windings of said loop, the transfer current being below the threshold required to switch flux around the relatively long flux paths of the core elements when both apertures are blocked but above the threshold required to switch flux around the relatively long flux paths when only one of the apertures is blocked.

References Cited in the file of this patent

UNITED STATES PATENTS

| | | |
|---|---|---|
| 2,781,503 | Saunders | Feb. 12, 1957 |
| 2,785,390 | Rajchman | Mar. 12, 1957 |
| 2,810,901 | Crane | Oct. 22, 1957 |
| 2,818,556 | Lo | Dec. 31, 1957 |
| 2,842,755 | Lamy | July 8, 1958 |
| 2,911,628 | Briggs et al. | Nov. 3, 1959 |